Patented Aug. 2, 1927.

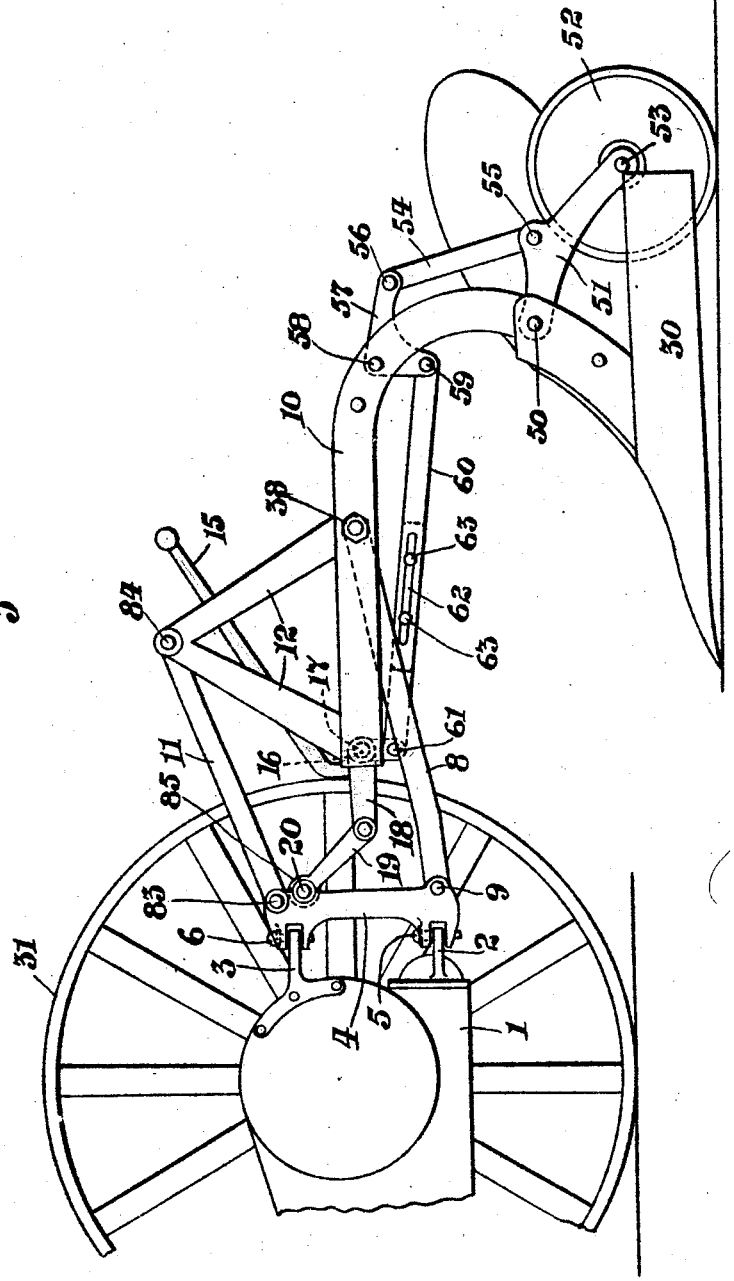

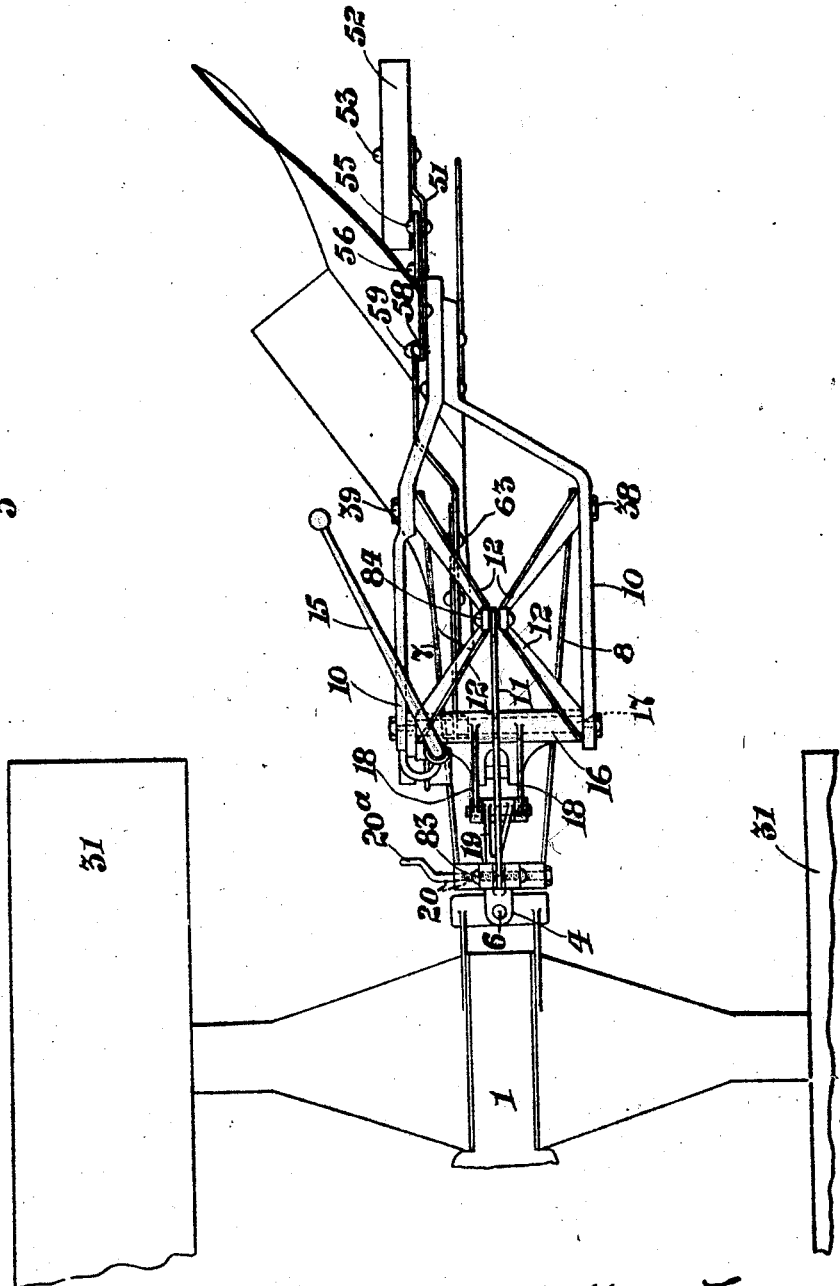

1,637,811

UNITED STATES PATENT OFFICE.

HARRY FERGUSON, OF BELFAST, IRELAND.

AGRICULTURAL IMPLEMENT.

Application filed February 21, 1924, Serial No. 694,195, and in Great Britain December 11, 1923.

This invention relates to tractor drawn agricultural implements, its object being to provide improvements therein whereby the soil engaging part, or parts, of the implement can be kept at a regular depth of cut in spite of the pitching or tilting movements of the tractor as it travels over undulating ground.

At present, in tractor drawn implements, especially tractor-unit-ploughs the pitching of the tractor affects the implement and varies or alters the ploughing depth. This has been a great source of trouble in the past. The present invention overcomes the difficulty.

According to this invention the implement is provided with a depth regulating member (which may take the form of a wheel or skid, preferably a wheel) which is adapted to contact with and move over or along the ground as the implement is drawn forward by the mechanical tractor or tractor carriage. The depth regulating member and the implement are arranged to be relatively movable and the member is connected by movable members hereinafter, in a general sense, referred to as linkage connections with the implement head in such manner that as the implement is drawn along, the pitching movements of the tractor (communicated to the head) are compensated for and prevented from moving the implement so as to alter or vary its depth of cut from that determined by the depth control lever of the implement, and, consequently, ensure a regular depth of cut.

In the case of a tractor plough the depth regulating member would, preferably, be arranged to run in the furrow.

Hitherto, in order to keep agricultural implements at a regular depth of cut when being drawn by a tractor, they have been, generally speaking, either entirely or partially supported by wheels, or equivalent. Weight carried in this way increases the draft, particularly in soft land where the wheels are inclined to sink. Moreover such arrangements do not obviate the difficulties due to relative movements of tractor and implement. This invention differs from previous practice, where wheels are used, in that only a very slight weight is carried by the depth regulating wheel, the greater part of the weight of the implement being carried on the tractor itself thereby reducing draft, and, therefore, operating costs to the farmer. In some cases, in fact, nearly the whole weight of the implement may be carried by the tractor, the depth regulating wheel simply running on the ground.

In carrying out the invention, say for a tractor plough of the unit type, I provide the implement with a wheel or skid which is movably secured thereto, preferably, by a pivotal arm or the like, which is connected by a link to a pivotal member on the implement frame, the pivotal member, in its turn, being connected by a link to a bell crank or equivalent at the plough head which bell crank is also link connected to the tractor, the whole arrangement being such that, as the tractor moves relatively to the implement, the aforesaid linkage connections between the wheel or skid and the tread are operated. The movable linkage connections are such that as the tractor tilts or pitches longitudinally, as it travels over undulating ground, the movements of the tractor act on the linkage connections whilst the wheel, as it travels over the ground, reacts on the said connections with the result that the implement is automatically maintained at its proper working depth and is not affected by the pitching of the tractor. The working depth can be altered from time to time by a suitable form of depth control gear which forms or may form part of the aforesaid linkage connections.

The arrangement is specially suitable for use in combination with a draft connection such as described in my prior U. S. patent specification No. 1,464,130 issued August 7, 1923, comprising a head for attachment to a tractor and with upper and lower link members pivotally connected to the implement and to the head, the lower link member, or members, being so arranged as to exert a downward force on the implement under the draft of the tractor, and the upper link member, or members, being arranged to prevent the implement turning angularly out of the ground. The depth regulating member may then be connected through the medium of links and levers with depth control means comprising a crosshead pivoted on the implement, a double link connection between said crosshead and the implement head, and a lever for turning said crosshead for the purpose of raising and lowering the implement.

In order that the invention may be more clearly understood I have appended explanatory drawings, whereon Figure 1 is an elevation and Figure 2 a plan of a plough coupled to a tractor, partly shown in outline, by a hitch connection as aforesaid and embodying the improved depth control means.

The tractor 1 (which in the drawings is a four-wheeled "Fordson") has a draw bar 2 and a corresponding abutment 3. The plough head 4 is pivotally connected to the draw bar 2 and the abutment 3, by means of drop pins 5 and 6, its jaw engaging the abutment and the draw bar through which the drop pins pass so that, as will be readily understood, the plough head can freely swing or move from side to side upon the abutment and the draw bar.

The plough frame 10 is connected to the head 4 by means of a pair of lower links 7 and 8 (see particularly Figure 2) which are movably jointed, on the one hand, to the pivot pin 9 of the member 4 and, on the other hand, by bolts 38 and 39 to the frame. The frame is also connected to the head 4 by means of a single upper link 11 and struts 12, 12, on the plough frame, the parts being pivotally connected together by pivot pins 83 and 84. The whole link connection can move bodily upwards and downwards as the implement and tractor change their relative positions owing to the contour of the ground over which the implement is drawn.

The plough is operated manually by means of the control lever 15 secured rigidly at its lower end to a hollow crosshead 16 which is arranged between the parallel sides 10, 10 of the plough frame. The crosshead 16 has two forwardly projecting arms 18 between which a pivotal link 19 is arranged. At its forward end the link is made one with a sleeve 85 mounted on a screwed shaft 20 provided with a turning handle 20ª (Fig. 2), the shaft being mounted in bosses on the plough head 4. This shaft engages with an internal thread in the aforesaid sleeve so that, by rotating the handle 20ª, the screw can be turned and the sleeve 85 made to move laterally and at the same time move the crosshead 16 and the plough frame and share laterally. A forward pull of the lever 15, owing to the fact that its lower end is made one with the crosshead 16, turns the latter upon its shaft 17 with the result that the plough frame 10, together with the shares, are raised and when the plough is not in operation it remains in this position attached to the rear of the tractor, being retained in place by the action of suitable retaining means. A rearward movement of the lever 15 lowers the share into the ground.

Pivoted to the rear of the plough frame, at 50, is an arm 51 on which a ground engaging wheel 52 is rotatably mounted at 53. One end of a link 54 is pivotally connected, at 55, to the arm 51 and its other end is connected, at 56, to one arm of a bell crank lever 57, pivoted at 58 on the plough frame, its other arm being connected, at 59, to a rod 60 whose other end is pivoted, at 61, to a depending arm of the crosshead 16.

For the purpose of initially adjusting the setting of the wheel 52 relative to the plough share the rod 60 is made in two parts connected together by bolts 63 attached to one of the parts and projecting through an elongated slot 62 in the other of the parts. It is apparent that with this arrangement the effective length of the rod 60 can be varied in order to adjust the position of the wheel.

When the plough share is lowered into the ground by means of the hand lever 15 the penetration of the share, as the tractor 1 moves forward, will force it downward into the ground until the wheel 52 comes in contact with the ground, this giving the normal working position of the implement and the tractor relative to each other when operating over level ground. When the wheel 52 bears on the ground the greater part of the weight of the implement is thrown on to the tractor through the link connections hereinbefore described. The weight thus put on the tractor can be varied by an alteration in the leverage of the connections. Should the rear wheel or wheels 31 of the tractor rise on a height (or the front wheels of the tractor drop into a hollow) then while the wheel 52 continues to run along the ground or the furrow bottom, as the case may be, the head 4 will be moved and the link 19 and arms 18 of the crosshead 16 will straighten out automatically and thereby turn the crosshead 16 in a clockwise direction (Fig. 1) so that the rod 60, bell crank lever 57, link 54 and arm 51 carrying the wheel 52 will be moved immediately about their connections and will compensate for the new positions taken up by the hitch members 11, 7, and 8, thereby maintaining the implement at a regular working depth.

Conversely, when the rear end of the tractor falls into a hollow (or when the front end of the tractor rises), the link 19 and arms 18 of the crosshead 16 will be automatically folded to a greater extent and thereby turn the crosshead in an anti-clockwise direction so that the rod 60, bell crank lever 57, link 54 and arm 51 carrying the wheel 52 will be moved about their connections in order to compensate for the new positions assumed by the hitch members 11, 7, and 8, thereby maintaining the implement at a regular working depth.

It will be obvious that, in this way, the pitching movements of the tractor will be prevented from varying the ploughing depth.

In the foregoing the improved depth regulating means has been described as applied to a single furrow plough but it can obviously be applied to a multi-furrow plough.

When used in combination with a hitch connection between the plough and the tractor comprising upper and lower link members as aforesaid and by which a part of the weight of the plough is carried by the tractor, when the former is in operation, there is the advantage of greatly reduced draft and consequently reduced operating costs to the farmer. However, the depth control means is not necessarily restricted for use with such a connection. It could, for example, be connected to an ordinary plough in which the frame is coupled by a one point connection to the tractor. The essential feature is that the wheel or the like be floatingly mounted on the implement and connected with the tractor or its equivalent in such manner that relative upward and downward movement between the tractor and the implement will produce a compensating action on said connection.

In the case of the invention being applied to an implement such as a two or three wheeled plough of the ordinary tractor type the connection between the wheel or equivalent would be designed to give the same results in substantially the same way as hereinbefore described.

Although the invention is specially applicable to tractor-implements of the unit type it can obviously be applied to implements adapted to be drawn by tractors in the ordinary way or by wheeled carriages or the like, themselves drawn by mechanical means or by horse where there is relative movement between the head of the implement and the implement itself.

In the case of a cultivator or other like implement the member 52 may be so connected as to be movable in all directions, for example, by providing a castor connection, or a universal joint connection, at the pin 50.

Provision may be made whereby the wheel 52, in the case of a plough, may run against the furrow wall and take up the normal landside pressure.

When using the term "tractor" it is to be understood to include a "tractor carriage."

Having now fully described my invention what I claim and desire to secure by Letters Patent is:—

1. In combination, an agricultural implement, a draft connection between the implement and the tractor allowing freedom of relative bodily up and down movement therebetween, ground engaging means on the implement, and means cooperating with said draft connection and said ground engaging means whereby, on the occurrence of pitching movements of the tractor, the said movements are compensated for so as to maintain the implement at a regular working depth in the ground.

2. In combination, an agricultural implement, a tractor, a draft connection between the implement and the tractor allowing freedom of relative bodily up and down movement therebetween, ground engaging means on the implement, and linkage connections which co-operate with said draft connection and said ground engaging means to compensate, on the occurrence of pitching movements of the tractor, for said movements so as to maintain the implement at a regular working depth in the ground.

3. In combination, an agricultural implement, a tractor, an implement head pivotally connected to the tractor about a vertical axis, link connections pivoted about horizontal axes to the head and to the implement, ground engaging means on the implement, and linkage means connecting said ground engaging means to said implement head and which, on the transmission of pitching movements of the tractor to the head, comes into operation and compensates for said movements so as to maintain the implement at a regular working depth in the ground.

4. In combination, an agricultural implement, a tractor, an implement head pivotally connected to the tractor about a vertical axis, upper and lower draft links pivoted about horizontal axes to the head and to the implement, a ground engaging wheel on the implement movable relatively thereto, and a system of linkage connections between the wheel and the implement head, which, on the occurrence of pitching movements of the tractor, coacts with the draft links, to compensate for said movements so as to maintain the implement at a regular working depth in the ground.

5. In combination, an agricultural implement, ground engaging means on the implement, a draft connection for hitching the implement to a tractor, and linkage interposed between said draft connection and said ground engaging means which, when the implement is connected to a tractor and the tractor is subjected to pitching movements, coacts with the draft connection and compensates for said movements so as to maintain the implement at a regular working depth in the ground.

6. The combination with an agricultural implement of ground engaging means pivotally carried on the implement and capable of movement relatively thereto, a pivotal draft connection for hitching said implement to a tractor, the draft connection allowing freedom for relative bodily up and down movement between the implement and tractor, and linkage connections interposed between said ground engaging means and said draft connection and adapted to compensate for pitching movements of the tractor in order to maintain the implement, when working, at a regular working depth in the ground.

7. The combination with an agricultural implement of ground engaging means pivotally carried on the implement and capable of movement relatively thereto, an implement head adapted to be pivotally connected about a vertical axis to a tractor, draft link connections pivoted about horizontal axes on said implement head and on the implement, and linkage interposed between the ground engaging means and the implement head which, when the implement is connected to a tractor and the tractor is subjected to pitching movements coacts with the draft link connections and compensates for said movements so as to maintain the implement at a regular working depth in the ground.

8. The combination with an agricultural implement, adapted to be drawn by a tractor, of depth regulating means comprising an arm pivoted on the implement, and rotatably supported by said arm and adapted to bear on the ground, a bell-crank lever pivoted on the implement frame, a link connecting said wheel supporting arm and said bell-crank lever, a crosshead pivoted on the implement frame and having forwardly projecting arms and a depending arm, an implement head pivoted to the tractor and movable about a vertical axis, and a link pivotally connected for vertical movement to said implement head and to the forwardly projecting arms of the crosshead.

9. In an agricultural implement adapted to be drawn by a tractor, the combination of a hitch connection, comprising upper and lower link members, for coupling the implement to the tractor, means for raising or lowering the implement about said members, and depth regulating means co-acting with said hitch connection and operable by the pitching and tilting movements of the tractor, said depth regulating means comprising an arm pivoted on the implement, and rotatably supported by said arm and adapted to bear on the ground, a bell-crank lever pivoted on the implement frame, a link connecting said wheel supporting arm and said bell-crank lever, a crosshead pivoted on the implement frame and having forwardly projecting arms and a depending arm, an implement head pivoted to the tractor and movable about a vertical axis, and a link pivotally connected for vertical movement to said implement head and to the forwardly projecting arms of the crosshead.

10. The combination with an agricultural implement, of an implement head adapted to be pivotally connected about a vertical axis to a tractor, link connections pivoted about horizontal axes to the head and to the implement, and depth regulating means comprising an arm pivoted on the implement, and rotatably supported by said arm and adapted to bear on the ground, a bell-crank lever pivoted on the implement frame, a link connecting said wheel supporting arm and said bell-crank lever, a crosshead pivoted on the implement frame and having forwardly projecting arms and a depending arm, and a link pivotally connected for vertical movement to said implement head and to the forwardly projecting arms of the crosshead.

In testimony whereof I affix my signature.

HARRY FERGUSON.